United States Patent [19]

Tanaka et al.

[11] 4,081,153
[45] Mar. 28, 1978

[54] SAFETY BELT TENSIONING AND REWINDING RETRACTOR

[75] Inventors: Akira Tanaka, Northridge; Charles Ulrich, Montecito, both of Calif.

[73] Assignee: American Safety Equipment Corporation, Encino, Calif.

[21] Appl. No.: 751,753

[22] Filed: Dec. 17, 1976

[51] Int. Cl.² .................. A62B 35/00; B65H 75/48
[52] U.S. Cl. ..................... 242/107; 242/107.4 R
[58] Field of Search .................. 242/107–107.7; 267/156; 185/9–14, 37, 39; 297/388; 280/744–747

[56] References Cited

U.S. PATENT DOCUMENTS

| 3,047,280 | 7/1962 | Pernetta | 267/156 X |
| 3,984,063 | 10/1976 | Knieriemen | 242/107 |
| 3,997,126 | 12/1976 | Karlsson | 242/107 |
| 4,002,219 | 1/1977 | Steinmann | 242/107 X |

Primary Examiner—Harvey C. Hornsby
Assistant Examiner—John M. Jillions
Attorney, Agent, or Firm—Guy Porter Smith

[57] ABSTRACT

A safety belt tensioning and rewinding retractor has a safety belt storage reel rotatably mounted to a retractor frame, emergency locking means for locking the reel against belt protraction, a member rotatably mounted in the retractor frame and means for limiting rotation of such member in a first rotative direction, a first biasing means connected between such member and reel for biasing the member toward the limiting means and the reel in an opposite belt rewinding direction, means for releaseably connecting the member to the reel to block the bias of the first biasing means when the belt is placed in a position of use and second biasing means for biasing the member in a belt rewind direction such that when the bias of the first biasing means is blocked through the connection of the member and reel, a reduced lower tension is applied to the seat belt in use due to the bias of the second biasing means applied to the reel in a rewind direction. The first and second biasing means include coil springs positioned laterally of one another in a narrow housing positioned against one side wall of the retractor frame with means for interconnecting the second laterally disposed coil spring to the aforementioned member through a serpentine spring connection in a preferred embodiment or a gear drive connection in a second embodiment for driving the member and reel when the bias of the main rewind spring is blocked.

19 Claims, 14 Drawing Figures

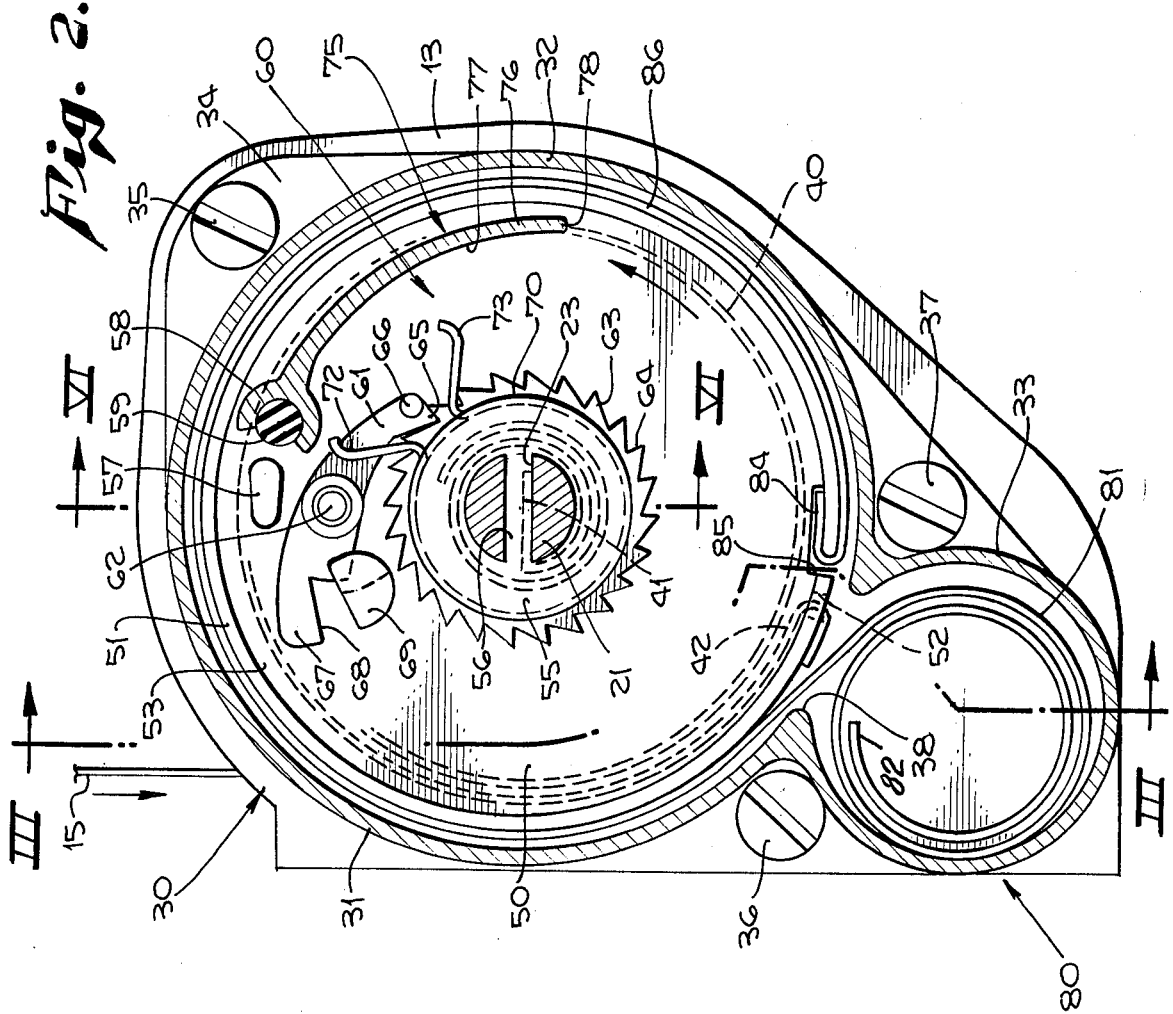

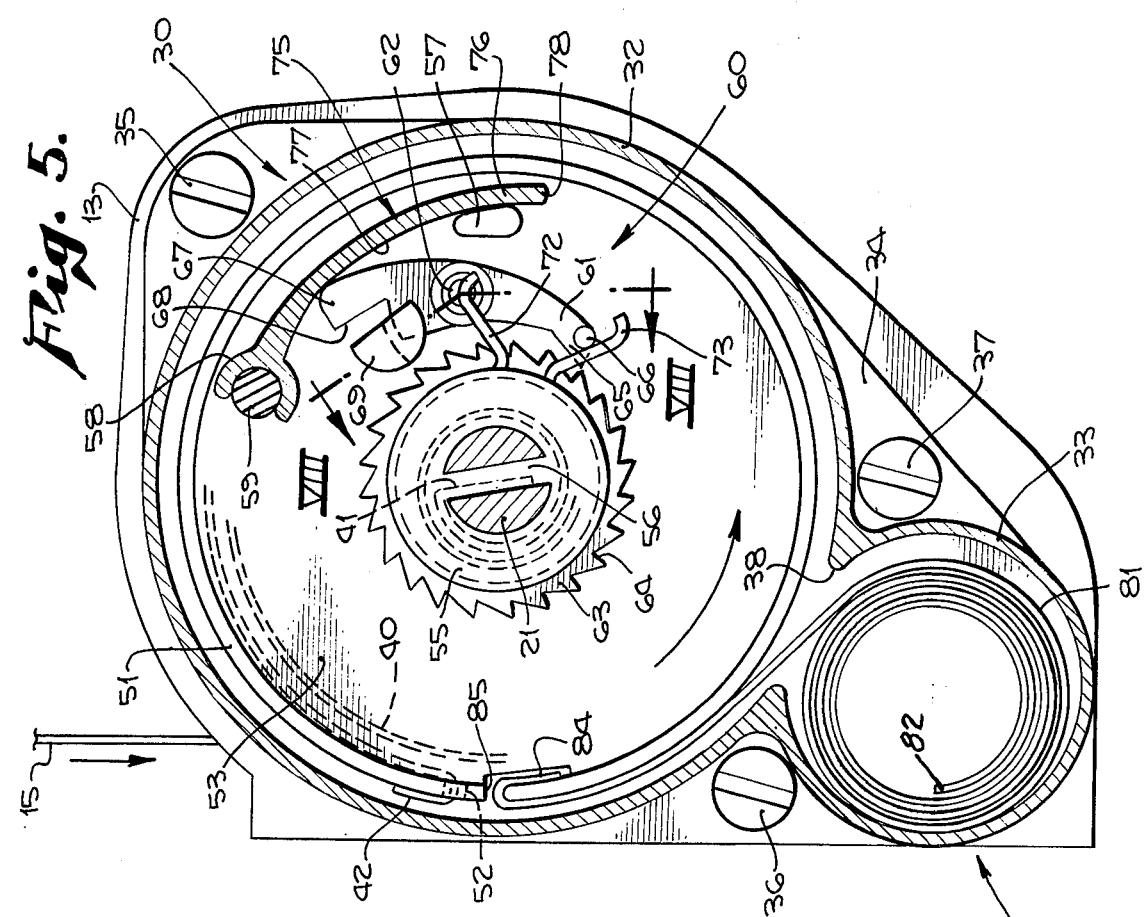
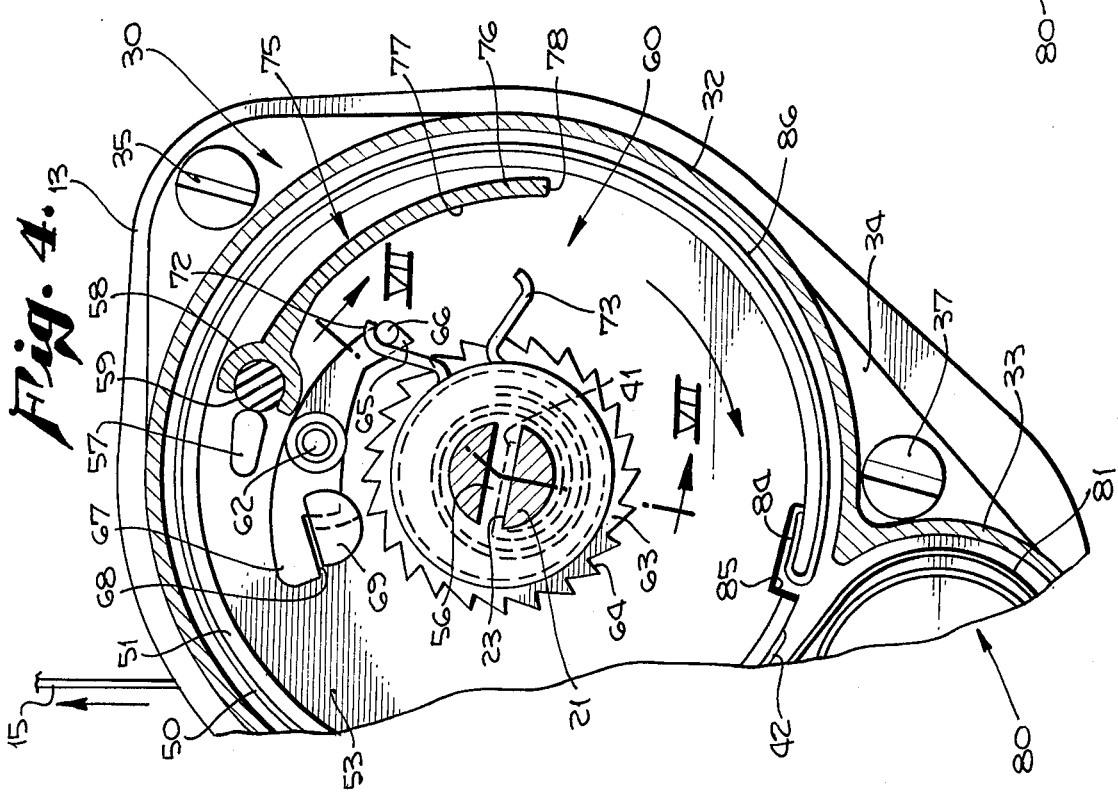

SAFETY BELT TENSIONING AND REWINDING RETRACTOR

BACKGROUND OF THE INVENTION

This invention relates in general to safety belt tensioning and rewinding means for retractors employed for storing safety belts or webbing of safety harnesses utilized in vehicles for restraining a passenger in his seat during emergency conditions. More specifically, the present invention in safety belt tensioning and rewinding means relates to devices for applying a low tension on the safety belt when unwound or protracted to a position of use about a vehicle occupant yet provide for a full winding of the belt under the stronger bias of a main rewind spring when the belt is not in a position of use.

Emergency locking retractors normally used in safety harness systems employed in vehicles currently are of the emergency locking type, i.e. the retractor locks against further belt unwinding or protraction only in the event of an emergency condition which may be sensed due to strap acceleration as the persons body moves forward pulling the strap out of the retractor or in response to changes in vehicle acceleration sensed by an inertia sensor or mass associated with the retractor. In such emerency locking retractors, the seat belt webbing or belt is free to move in and out under normal occupant movement subject to the rewind bias of the retractor rewind spring. Tension applied to the belt by virtue of the bias of the rewind spring required for rewinding long lengths of webbing or safety belt employed in safety harness systems can be objectionable to the user. Therefore, various arrangements have been made heretofore for reducing the tension applied to the belt by the rewind spring when the belt is placed in use.

Exemplary of such prior attempts to provide a tension free seat belt retractor is U.S. Pat. No. 3,834,646 wherein the belt tension is completely relieved by means activated by belt manipulation to hold the belt storage reel against retraction. Exemplary of a reduced tension effect for the seat belt are copending applications for U.S. Pat. Ser. No. 701,504 filed July 1, 1976 and application Ser. No. 706,772 filed July 19, 1976. In the retractors of these prior co-pending applications, rewind spring means and low tension applying "low tension zone" spring means are provided coaxially of one another in the retractor for conjugate and/or separate action on the associated reel as explained more fully in such applications. However, we have found it to be desirable to provide a safety belt tensioning and rewinding retractor wherein the low tensioning and rewinding means may be provided in a laterally disposed relative relation in order to allow for a more compact retractor construction and wherein the second biasing means operates in a novel and more fascile manner in association with the reel and first biasing means than those of our prior attempts.

SUMMARY OF THE INVENTION

It is therefore a primary object of the present invention to disclose and provide a safety belt tensioning and rewind retractor wherein first and second biasing means are provided in a more compact and fascile manner to provide a low tension "low tension zone" effect for the retractor when the seat belt is in use and a full rewinding bias effect on the belt when the belt is to be retracted from a position of use.

It is another object of the present invention to disclose and provide a safety belt tensioning and rewinding retractor as in the foregoing object wherein the biasing means are provided in a compact manner within a housing provided on a side wall of the retractor frame such that the retractor will be easily assembled and will occupy a minimum of space when installed in a vehicle having a safety belt harness system with which the retractor is to be employed.

It is a still further object of the present invention to disclose and provide a safety belt tensioning and rewinding retractor as in the foregoing objects wherein a second biasing means employed for applying a low tensioning effect on the belt when in use is disposed laterally of a primary biasing means for rewinding the safety belt when the belt is not in use with an effective and operable means for interconnecting the second biasing means to the reel from its relatively lateral position to operate upon the reel when the main biasing means is blocked out to provide for the reduced low tension zone effect.

Generally stated, the present invention accomplishes the aforestated objects and is an improvement over prior retractors having a safety belt storage reel rotatably mounted to a retractor frame and which is lockable against belt protraction by emergency locking means through the provision of a member rotatably mounted to the retractor frame and means for limiting rotation of such member in a first rotative direction, a first baising means connected between such member and the reel for biasing the member toward said limiting means and thus the reel in an opposite, belt rewinding direction, means for releaseably connecting such member to the reel to lock the bias of the first biasing means when the belt is placed into a position of use and a second biasing means for biasing the member in a belt rewind direction such that when the reel is connected to the member and the bias of the first biasing means is blocked the reel is biased in a rewind direction by the second biasing means which is preferably of a smaller amount for providing a reduced tension on the belt.

More specifically, the present invention includes the provision of means for mounting the first and second biasing means to the retractor frame in spaced relation in a lateral direction relative to the axis of the reel so that they may be disposed within a relatively thin space saving housing provided on a side wall of the retractor frame. It is contemplated that the first and second biasing means comprise coil springs, each having a central axis about which it operates, with the aforementioned mounting means mounting such first and second coil springs with their respective axes in spaced parallel relation.

The present invention further contemplates a novel and more fascile arrangement for interconnecting the second laterally disposed biasing means to the member for driving it and the connected reel in a rewind direction when the primary spring bias is blocked through the provision of a serpentine configured spring connection with the member in a preferred exemplary embodiment and a gear drive connection between such second spring biasing means and the member in an alternative embodiment.

More specifically, the present invention includes the provision of a spring wire combination clutch and cam means having a circular body portion mounted in frictionally driven relation to the reel with oppositely directed cam arm portions for engaging a pawl employed for locking the member to a ratchet interconnected with the reel. The member and reel are interconnected through operation of the clutch and cam means on the pawl upon a slight rewinding movement of the reel following a belt unwinding movement with the clutch and cam means being provided in a more inexpensive and fascile manner than heretofore. Further, specific bumper and stop means are provided for limiting rotative movement of the member with the stop means being formed integrally of a cam means provided for pawl release and integrally of the housing to provide a more easily manufactured and assembled retractor construction.

A better understanding of the present invention in safety belt tensioning and rewinding retractor as well as a better appreciation for how the present invention achieves the aforestated objects will be afforded to those skilled in the art from a consideration of the following detailed description of a preferred and an alternative exemplary embodiment thereof.

BRIEF DESCRIPTION OF THE DRAWINGS

FIG. 2 is a side view, partially in section, of the retractor of FIG. 1 taken therein along the plane II—II showing the retractor in a low tension zone mode;

FIG. 3 is a section view of the retractor of FIG. 2 taken therein along the plane III—III;

FIG. 4 is a view of the retractor as in FIG. 2 showing the retractor in a belt unwinding mode;

FIG. 5 is a view of the retractor as in FIG. 2 showing the retractor in a belt rewinding mode;

DETAILED DESCRIPTION OF A PREFERRED EXEMPLARY EMBODIMENT

Figure 1:
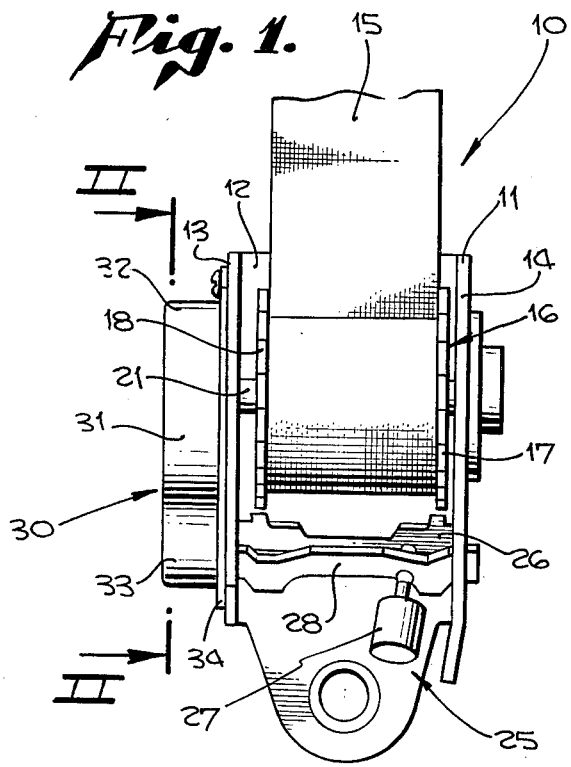
FIG. 1 is a plan view of a exemplary emergency locking retractor employing the improvement in safety belt tensioning and rewinding retractor means in accordance with the present invention.
Figure 8:
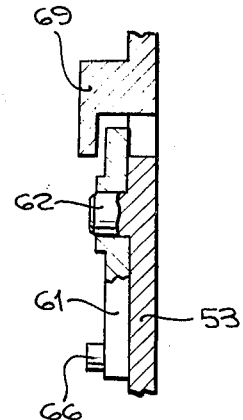
FIG. 8 is a detail section view of a portion of the retractor of FIG. 5 taken therein along the plane VIII—VIII.
Figure 6:
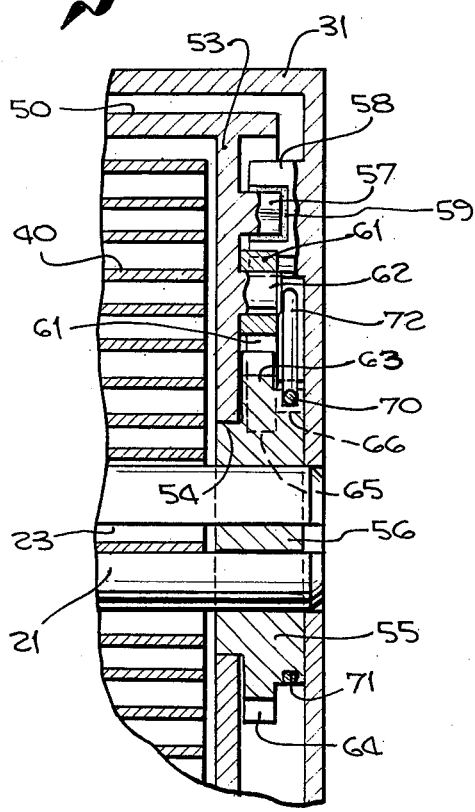
FIG. 6 is a section view of the retractor of FIG. 2 taken therein along the plane VI—VI.
Figure 7:
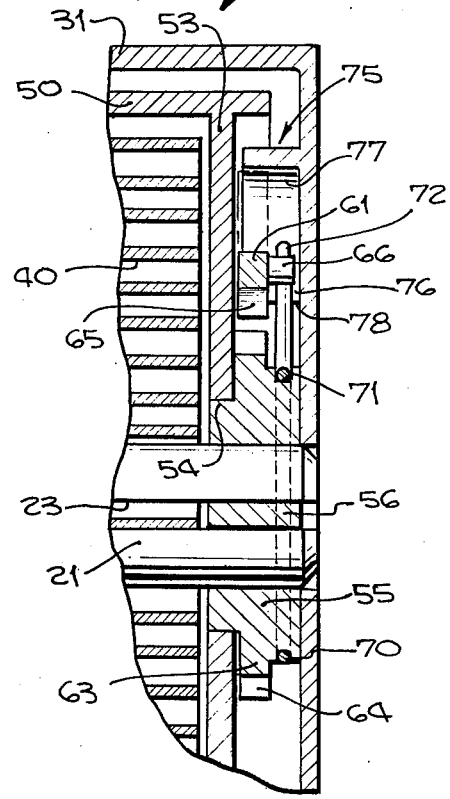
FIG. 7 is a section view of the retractor of FIG. 4 taken therein along the plane VII—VII.

Referring initially to FIG. 1, an exemplary embodiment in safety belt tensioning and rewinding retractor in accordance with the present invention is illustrated. The retractor, indicated generally at 10, as is conventional in emergency locking retractors, includes a generally U-shaped frame 11 having base 12 and side walls 13 and 14. Safety belt 15, which may be part of a safety harness or belt system as known in the industry, is wound upon the reel, indicated generally at 16, of the retractor as best seen in FIGS. 2 and 3. The reel includes a pair of spaced ratchet wheels 17 and 18 fixed upon shaft 21 which in turn is mounted by bushings, as bushing 20, to the retractor frame side walls 17 and 18. Spool 19 is fixed to ratchet wheels 17 and 18 in conventional manner.

Emergency locking means are provided in the exemplary retractor as indicated generally at 25. Such means, in the exemplary embodiment, includes a locking pawl bar 26 pivotally mounted between frame side walls 13 and 14 for engagement with the respective ratchet wheels 17 and 18 on tilting movement of bar 26. A pendulum-like inertia sensor mass 27 is suspended from support bar 28 to place a head portion thereof beneath bar 26 to cause tilting movement of bar 26, to lock the retractor against further belt unwinding on swinging movement of pendulum 27, as during a deceleration of the vehicle in an emergency situation. The retractor construction explained thus far is considered conventional.

As is particularly contemplated within the present invention, safety belt tensioning and rewind means are provided for normally causing belt 15 to be rewound into a stored condition on reel 16 and, importantly, to provide for a reduced tension effect on belt 15 when placed in use by an occupant of a vehicle in which the retractor is utilized. An exemplary safety belt tensioning and rewinding means, in accordance with the present invention, is indicated generally at 30 in FIG. 1 within housing 31 which includes an upper generally cylindrical portion 32 and a lower, laterally displaced, smaller generally cylindrical portion 33. As seen in FIGS. 2 and 3, housing 31 includes a base 34 by which the housing is mounted to frame side wall 13 and retained there via suitable fasteners, as fasteners 35, 36 and 37, which in the exemplary embodiment may include head bolts threaded through base 34 into retractor side wall 13. As best seen in FIG. 2, a port 38 allows communication between the two housing portions 32 and 33 for purposes as will become apparent subsequently.

First biasing means for biasing the safety belt reel 16 toward a belt storage condition is provided within housing portion 32. In the exemplary embodiment, such first biasing means comprises a main rewind spring 40 which is of coil configuration having its inner end 41 connected to shaft 21 via slot 23. An outer end 42, as seen in FIG. 2, is connected to member 50 whose function will be described subsequently.

As best seen in FIGS. 2 and 3, member 50 is rotatably mounted relative to shaft 21 and, in the exemplary embodiment, is of drum-like configuration having a cylindrical outer wall 51 provided with a slot 52 which receives the outer end 42 of the rewind spring 40. Drum member 50 is further provided with a cylindrical web 53 which has a central aperture mounted upon and rotatable relative to an inner bushing portion 54 of bushing 55 which is fixed via web 56 in non-rotatable relation to shaft 21.

From the foregoing, it can be seen that spring 40 normally biases member 50 in a clockwise direction and shaft 21 in a counterclockwise, webbing rewind, direction in FIGS. 2, 4 and 5. However, in accordance with the present invention, means are provided for limiting the clockwise rotation of member 50, such means in the exemplary embodiment including the provision of bumper 57 upon web 53 of member 50 and a co-operating stop or abutment 58 formed integrally of housing 31. Stop or abutment 58 is provided with a resilient stop member 59 against which bumper 57 may abut, as seen in FIG. 4, to limit clockwise rotation of member 50 during an unwinding of belt 15 off reel 16 against the bias of main spring 40.

In accordance with the present invention, means are provided for releaseably connecting member 50 to reel 16 to block the bias of rewind spring 40, and thus relieve belt 15 of tension due to the spring bias, when belt 15 has been unwound to a position of use. Such connecting means in the exemplary embodiment is indicated generally at 60 and includes the provision of pawl 61 mounted by mounting pin 62 for pivotal movement on web 53 of member 50. A ratchet 63 of wheel or gear-like configuration is formed integrally of bushing 55, as seen in FIGS. 2 and 3, with teeth 64 facing in a counterclockwise direction in FIG. 2 for engagement by pawl tooth 65 as seen in FIG. 2. When pawl 61 engages ratchet 63 as seen in FIG. 2, member 50 is thus connected to shaft 21 and reel 16 in a manner preventing relative rotation due to the bias of main spring 40. The connecting means indicated generally at 60 may thus be considered a means for blocking out the bias of the first biasing means, according to the present invention, which in the exemplary embodiment comprises coil spring 40.

The operation of pawl 61 between engagements and disengagements with ratchet 63, as will be explained more fully hereinafter, is in part controlled by a spring wire combination clutch and cam means 70 which has a circular body portion mounted in groove 71 of member 55 to provide a frictionally driven relation to cam means 70 in response to rotation of reel 16. Combination clutch and cam means 70 is further provided with cam arm portions 72 and 73, as seen in FIG. 2, for engaging cam follower pin 66 provided on pawl 61. During a normal unwinding operation of reel 16, as seen in FIG. 4, cam arm 72 will move cam follower pin 66 to the position shown in FIG. 4 holding pawl 61 out of engagement with ratchet 63 and thus allowing the rewind bias of main spring 40 to be applied to belt 15 as belt 15 is unwound from the reel 16. However, on a slight rewinding movement of belt 15, as normally occurs during buckling up of a safety belt harness employing a safety belt as belt 15, the reel will move in a rewind direction from the position of FIG. 4 toward the position of FIG. 2 causing cam arm 72 to relieve cam follower pin 66 and allow pawl 61 to fall into engagement with ratchet 63. Such engagement occurs with bumper 57 still engaging member 59 of stop 58 with subsequent movement of member 50 and reel 16 in a counterclockwise direction from the position of FIG. 4 to the position of FIG. 2 being under the urging of the second biasing means in accordance with the present invention as will now be explained.

A reduced tension or "low tension zone" effect is provided in the exemplary embodiment of retractor when the bias of the aforedescribed first biasing means is blocked out through the interconnection of member 50 and reel 16 and in the present exemplary embodiment, comprises the provision of a second biasing means in a manner hereafter explained for biasing member 50 in a belt rewind direction whereby reel 16, when so connected to member 50, is biased in a rewind direction by a lower biasing effect of such second biasing means. Referring to FIGS. 2 and 3, in the exemplary embodiment, such second biasing means is indicated generally at 80 and includes a constant torque spring 81 of coil configuration with its main body portion positioned loosely within the laterally disposed smaller housing portion 33 with an inner end 82 merely left free. As particularly contemplated within the present invention, the second spring means 81 is positioned laterally of first spring 40 with their axes parallel and spaced laterally of one another in a direction normal to the axis of the reel shaft 21. This construction allows the positioning of the two spring means in a flater or narrower housing mounted to the side wall 13 as is deemed desirable for such retractors which are to be fitted into fairly small or compact locations in a vehicle in which the retractor is to be utilized. As further seen in FIGS. 2 and 3, second spring 81 is of serpentine configuration in that it winds from housing portion 33 through port 38 and into the larger housing portion 32 where its outer end 84 is secured to member 50 via slot 85 with outer end portions 86 of spring 81 encircling member 50 when member 50 is in the position as seen in FIG. 4 during belt unwinding. The bias of second spring 81 is thus in a counterclockwise direction in FIGS. 2 and 4, a direction opposite to the bias of first spring 40 on member 50.

As should be apparent from the foregoing, during an initial belt unwinding of belt 15 to a location of use, the retractor mode is as illustrated in FIG. 4 with member 50 being restricted in its clockwise rotation due to the engagement of bumper 57 with stop member 59, second spring 81 having been unwound against its bias and main spring 40 tending to cause rewind of reel 16. On a slight rewind movement of belt 15, cam means 70 releases pawl 61 as aforedescribed to allow pawl 61 to move from the position of FIG. 4 to a position engaging ratchet 63 as seen in FIG. 2. With the bias of main spring 40 thus blocked, the retractor is placed in a "low tension zone" or lower tension bias by the action of the smaller coil spring 81 which tends to move member 50 and interconnected reel 16 in a lower tension rewind direction as illustrated in FIG. 2 toward the pawl release position of FIG. 5. When the position of FIG. 5 is reached, the pawl 61 is released, as subsequently described, allowing for a rewind of belt 15 under the bias of main spring 40.

When the exemplary retractor is in the "low tension zone" mode as seen in FIG. 2, the lower tensioning effect on belt 15 due to the lower bias of spring 81 maintains the seat belt 15 snug against the users body, which would be the chest when belt is part of a typical vehicle safety harness of the three point emergency locking type currently in use. Such "low tension zone" tensioning of belt 15 will continue in the retractor construction of the current embodiment for up to nearly a full revolution of reel 16 in a counterclockwise direction from the position of FIG. 2 to the position of FIG. 5. Cam means, indicated generally at 75, are mounted to the retractor frame to be engaged by a portion of pawl 61 upon rotation of member 50 to the position of FIG. 5 in order to release pawl 61 from engagement with ratchet 63. As seen in FIGS. 2, 4 and 5, the cam means indicated generally at 75 comprises an arcuate body 76 having an inwardly facing cam surface 77 which is engaged by the cam follower rear end portion 67 of pawl 61. Cam surface 77 progresses radially inwardly from its leading end 78 in a counterclockwise direction in FIG. 5 so that cam follower portion 67 pivots pawl 61 out of engagement with ratchet teeth 64 by the time member 50 has rotated to almost a full counter revolution as seen in FIG. 5. A recess 68 is preferably provided in the rear end of pawl 61 to provide a surface to abut against limit member 69 which prevents over pivoting of pawl 61. As is preferred in accordance with the present invention, cam means 75 and bumper stop 58 are formed integrally of each other and of housing 31.

On release of pawl 61 from ratchet 63, the stronger rewind bias of spring 40 will cause an unwinding of smaller spring 81 to bring member 50 back to the position of FIG. 4 and to allow rewinding of webbing 15 under the strong rewind bias of spring 40. Specifically, as seen in FIG. 5, when pawl 61 is released from ratchet 63 spring 40 tends to turn bushing 55 counterclockwise and member 50 clockwise causing cam arm 73 to engage cam pin 66. As member 50 returns to the position of FIG. 4, combination clutch and cam means 70 is returned, via the engagement between cam pin 66 and cam arm 73, as well where it will continue to hold pawl 61 unlocked from ratchet 63 during a continuing full rewind of webbing 15 on reel 16. Subsequently, on pulling of belt 15 outwardly of the retractor, clutch and cam means 70 will move to the position of FIG. 4 to hold pawl 61 unlocked until there is a subsequent slight retractive movement of belt 15 as seen in FIG. 2.

ALTERNATIVE EXEMPLARY EMBODIMENT

Figure 9:
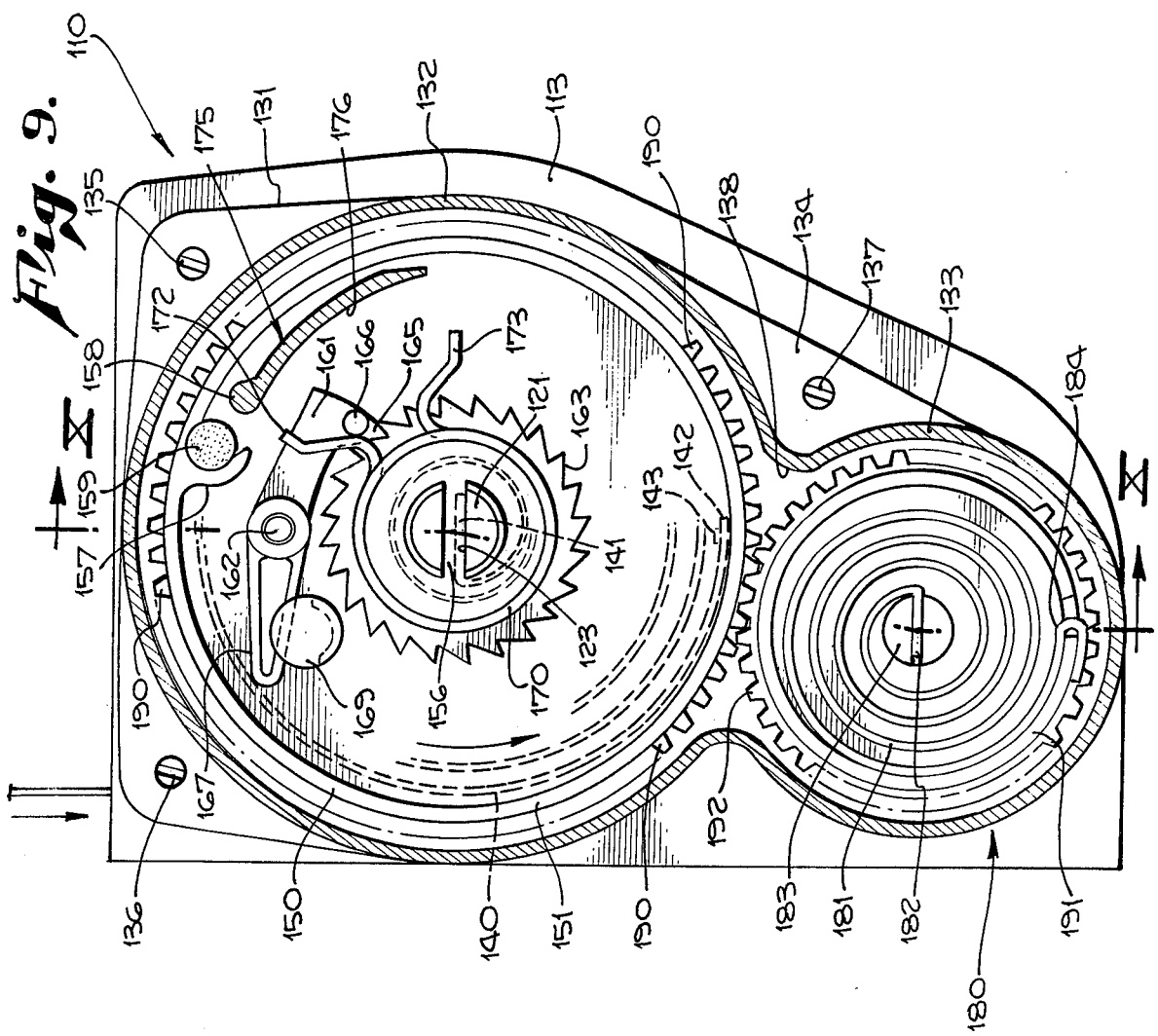
FIG. 9 is a side elevational view as in FIG. 2 showing an alternative construction of safety belt tensioning and rewinding retractor means in a low tension zone mode.
Figure 10:
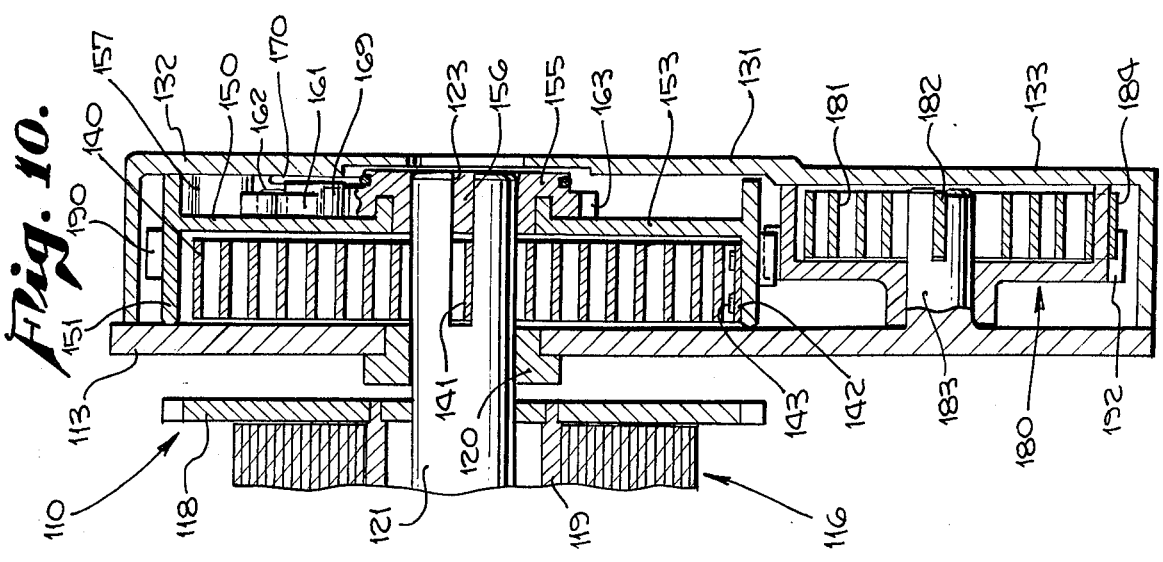
FIG. 10 is a section view of the retractor of FIG. 9 taken therein along the plane X—X.

An alternative exemplary embodiment of safety belt tensioning and rewind retractor in accordance with the present invention is shown in FIGS. 9 through 14. Referring first to FIGS. 9 and 10, the retractor indicated generally at 110 may, as with the retractor indicated generally at 10 in FIG. 1, employ a retractor frame having a side wall 13 mounting a reel indicated generally at 116 on a shaft 121 which is journaled by suitable bushings, as bushing 120 to the retractor side walls. The reel, indicated generally at 116, as before, includes a pair of ratchet wheels, as ratchet wheel 118 supporting spool 119.

Housing 131, in this embodiment, as before, includes an upper cylindrical portion 132 and a smaller lower or laterally disposed cylindrical portion 133 mounted by base 134 and suitable fasteners 135, 136 and 137 to side wall 113. A port 138 is formed in the housing between portions 132 and 133.

The first biasing means in the alternative exemplary embodiment includes, as before a first coil spring 140 having an inner end 141 connected to shaft 121 via slot 123 and an outer end 142 fastened by fastening means 143 to the surrounding cylindrical portion 151 of member 150. Member 150 is mounted on bushing 155 via web portion 153, member 155 being fixed by its web 156 to shaft 21 and member 150 being rotatable on member 155. However, as is particularly contemplated within the invention of the alternative exemplary embodiment, member 150 is provided with a plurality of gear teeth 190 about its periphery. Bumper 157 is formed integrally of member 150 and is provided with a resilient member 159 in its socket as seen in FIG. 9. Cam means 175 is formed integrally of stop or abutment 158 and housing 131 as in the preferred exemplary embodiment, but abutment 158 is of a generally circular or blunt ended configuration as seen in FIG. 9. The provision of resilient member 159 accomplishes a desired reduction of noise in operation of the retractor.

The construction of pawl 161, pivotally mounted on pin 162 with pawl tooth 165 for engagement with ratchet 163 is essentially the same as in the preferred exemplary embodiment aforedescribed. A combination clutch and cam means 170 is also provided as before. However, the configuration of pawl 161 at its rear end is slightly different with the rear end merely comprising a tapering extension 167 adapted to co-operate between cam surface 176 and limit member 169 during operation of the pawl and ratchet means as in the prior embodiment.

As is particularly contemplated within the present invention as expressed in the alternative exemplary embodiment, the second biasing means indicated generally at 180, includes a coil spring 181 having an inner end 182 fixed to a pin 183, with its outer end 184 being connected to a surrounding outer gear member 191 having gear teeth 192. Outer gear member 191 is positioned within housing 133 about spring 181 with its teeth 192 meshing with the teeth 190 provided on drum member 150 to provide a gear drive between the second spring 181 and member 50.

Figure 11:
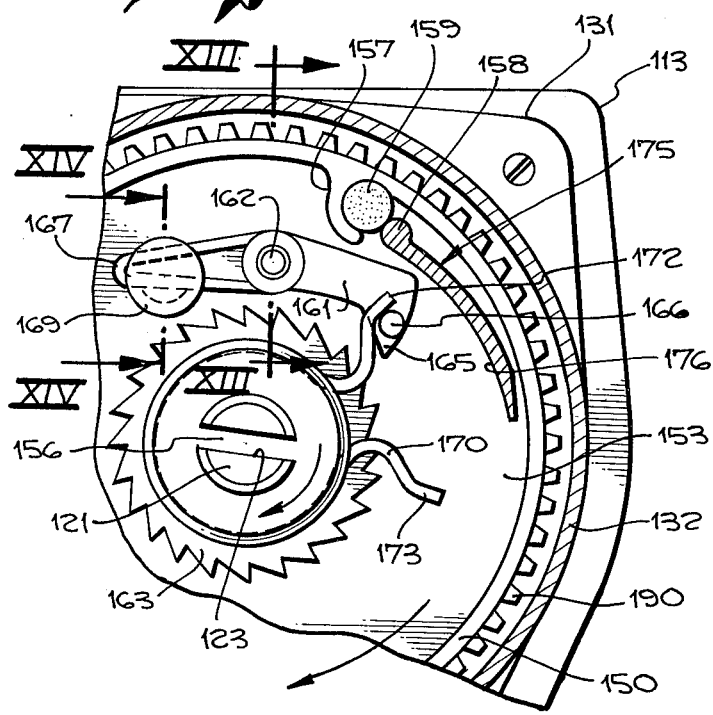
FIG. 11 is a view of the retractor as in FIG. 9 showing a belt unwinding mode.
Figure 13:
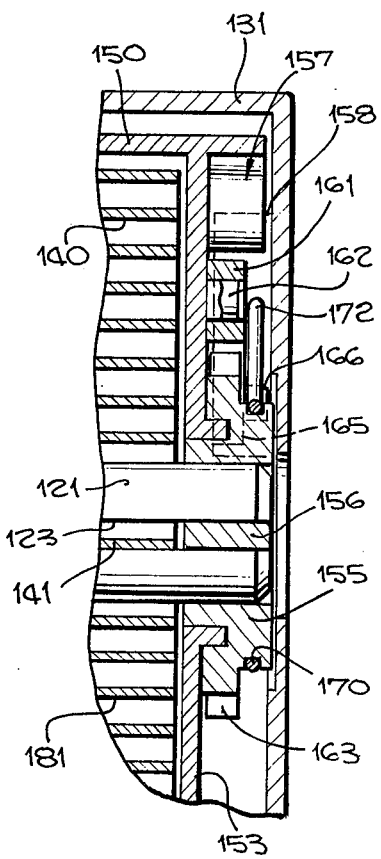
FIG. 13 is a detail section view of the retractor of FIG. 11 taken therein along the plane XIII—XIII.
Figure 12:
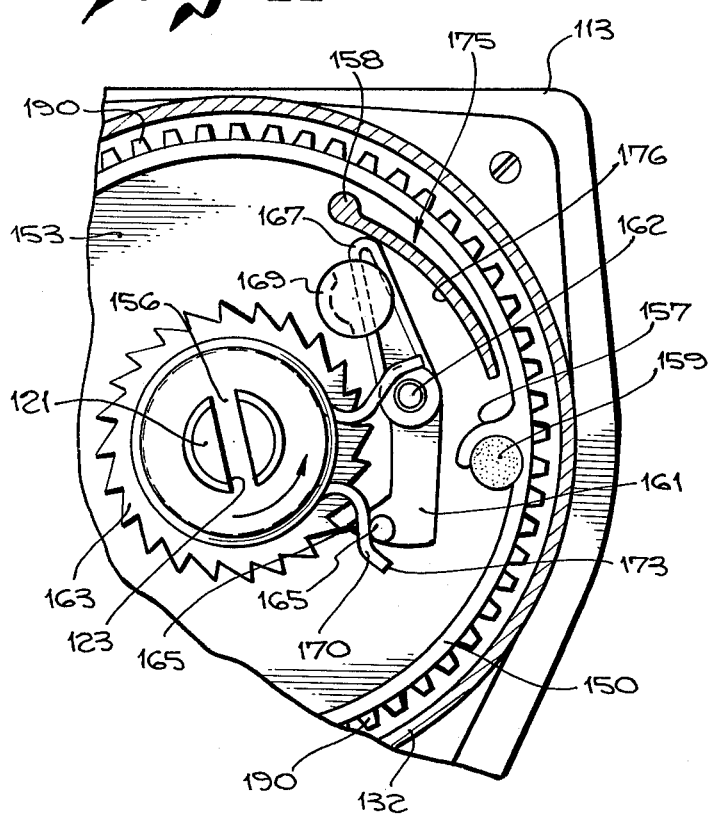
FIG. 12 is a view of the retractor as in FIG. 9 showing a belt rewinding mode.
Figure 14:
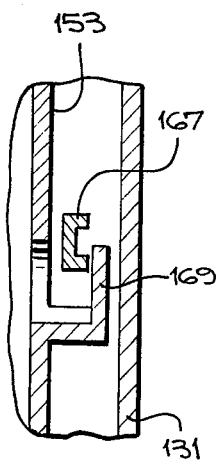
FIG. 14 is a detail section view of the retractor of FIG. 11 taken therein along the plane XIV—XIV.

As will be apparent from the foregoing, the retractor of the alternative exemplary embodiment will operate generally in the same manner as that of the preferred exemplary embodiment described hereinbefore, but the second biasing means, comprising spring 181, is connected by a gear drive to member 150 as opposed to the serpentine configuration and encircling connection of spring end 84 with member 50 employed for spring 81 of the preferred exemplary embodiment. The "low tension zone" effect of a reduced tension due to spring 81 may be provided as desired through the selection of the torque characteristics of the two springs 40 and 81 and/or varying the number of teeth provided for the gear teeth 190 on member 150 and gear teeth 192 on member 191. The mode of operation of the alternative exemplary retractor remains the same as that of the preferred exemplary embodiment of FIGS. 4 through 8 as seen in FIGS. 11–14. On unwinding of belt 115, member 150 will tend to turn clockwise with its bumper 157 and resilient member 159 abuting stop 158 as seen in FIG. 11. Pawl 161 is held unlocked by cam arm 172. On a slight belt rewind movement of reel 116, as seen in FIG. 9, pawl 161 is released and falls into locking engagement with ratchet 163. A "low tension zone" effect is then provided under the lower tension of spring 181 for the extent of belt travel allowed by reel movement from the position of FIG. 9 to the pawl release position of FIG. 12. The main spring is reactivated by protraction or retraction of belt 15 beyond the limits of such "low tension zone" belt movement.

Having thus described a preferred and alternative exemplary embodiment of safety belt tensioning and rewinding retractor means in accordance with the present invention, it should be apparent to those skilled in the art that various additional alternative embodiments, adaptations and modifications can be made within the scope and spirit of the present invention which is defined by the following claims.

We claim:

1. A safety belt tensioning and rewinding retractor having a safety belt storage reel rotatably mounted to a retractor frame and lockable against belt unwinding by emergency locking means, said retractor comprising:
   a member rotatably mounted to said frame and means for limiting rotation of said member in a first rotative direction;
   first spring means connected between said member and reel for biasing said member toward said limiting means and said reel in an opposite, belt rewinding direction;
   means for releasably connecting said member to said reel to block the bias of said first spring means when said belt is placed in a position of use; and second spring means for biasing said member in a belt rewind direction whereby said reel, when connected to said member by said connecting means, is biased in a rewind direction by said second spring means.

2. The retractor of claim 1 wherein the bias of said second spring means on said member is of a lesser amount and is in an opposite direction to that of said first spring means acting on said member.

3. The retractor of claim 1 wherein said means for releaseably connecting said member to said reel comprises:
a pawl and means for pivotally mounting said pawl on said member;
a ratchet mounted to said reel; and
a spring wire combination clutch and cam means having a circular body portion mounted in frictionally driven relation to said reel and oppositely directed cam arm portions for engaging said pawl to hold it disengaged from said ratchet during unwinding and rewinding of said reel.

4. The retractor of claim 1 wherein said means for releaseably connecting said member to said reel comprises:
pawl and ratchet means including a pawl pivotally mounted on said member and a ratchet connected to said reel for connecting said member and reel;
cam means provided on said frame for engagement by said pawl to release said pawl from said ratchet when said reel rewinds a predetermined amount under the urging of said second spring means; and
stop means provided on said member to stop pivoting release movement of said pawl under the action of said cam.

5. The retractor of claim 1 wherein said means for releasably connecting said member to said reel comprises:
pawl and ratchet means for connecting said member to said reel;
first cam means frictionally driven by rotation of said reel for interengaging said pawl and ratchet means upon a slight rewind movement of said reel following an unwinding movement thereof; and
second cam means mounted to said frame to be engaged by a portion of said pawl and ratchet means to disengage said pawl and ratchet means upon rotation of said member and reel in a rewind direction under the urging of said second spring means of a predetermined amount.

6. The retractor of claim 5 having a housing mounted to said frame wherein;
said member comprises a drum rotatably mounted on said frame within said housing and said limiting means comprises a bumper on said drum and a drum stop provided on said housing.

7. The retractor of claim 6 wherein:
said drum stop and second cam means are formed integrally of each other and of said housing.

8. The retractor of claim 6 wherein said reel has a shaft portion and said drum has a cylindrical outer portion and wherein;
said first spring means comprises a coil spring positioned within said drum with one end connected to said shaft portion of said reel and an opposite end connected to said cylindrical outer portion of said drum.

9. The retractor of claim 8 wherein:
said second spring means comprises a second coil spring having one end connected to said frame and an opposite end connected to said drum.

10. The retractor of claim 1 wherein:
said first spring means comprises a first coil spring having a central axis coaxial with said member and reel; and
said second spring means comprises a second coil spring having a central axis parallel to and spaced from the axis of said first spring means.

11. The retractor of claim 10 wherein:
said second spring means comprises a body portion disposed laterally of said first spring means and an extension thereof is wound about said member.

12. The retractor of claim 10 wherein:
said member is provided with peripheral gear teeth;
said second spring means includes a surrounding outer gear member having teeth meshing with corresponding teeth of said member whereby said second spring means applies its bias to said member through a gear drive therebetween.

13. In a safety belt retractor having a belt storage reel rotatably mounted on a retractor frame and emergency locking means for preventing belt unwinding when activated, the improvement in means for rewinding the safety belt onto the reel comprising the provision of:
first spring means for biasing said reel in a belt rewinding direction;
blocking means for blocking out the bias of said first spring means when said belt is placed in a position of use to relieve the belt of said bias;
second spring means for applying a second lower bias on said reel in a belt rewinding direction; and
means for mounting said first and second spring means to said frame in spaced relation in a lateral direction relative to the axis of said reel.

14. The improvement in safety belt retractor of claim 13 wherein:
said first and second spring means comprise coil springs, each having a central axis about which it operates; and
said means for mounting mounts said first and second spring means with their respective axes in spaced parallel relation.

15. The improvement in safety belt retraction of claim 14 wherein:
a rotatably member is rotatably mounted to said retractor frame;
said first spring means is connected at one end to said reel and at its opposite end to said member;
means are provided for limiting rotation of said member in the direction of rotation of said reel during belt unwinding whereby said first spring means biases said reel against unwinding rotation;
said blocking means comprises a pawl mounted on said member and a ratchet means connected to said reel for interconnecting said member and reel on engagement of said ratchet by said pawl to thereby block the bias of said first spring means; and
said second spring means is connected to said member to bias said member and reel in unison in a belt rewind direction.

16. A safety belt tensioning and rewind means in emergency locking safety belt retractors having a safety belt stored on a reel rotatably mounted to a retractor frame comprising:
a member rotatably mounted to said retractor frame;

first biasing means connected between said reel and said member for biasing each in opposite directions on said frame;

means for limiting rotation of said member in the direction of rotation of said reel when said belt is being unwound off of said reel whereby said reel is biased against rotation due to said belt unwinding;

means for selectively connecting said reel to said member preventing relative rotation under the bias of said first biasing means when said belt is placed in a position of use to relieve the bias of said first biasing means on said belt; and second biasing means connected to said member for applying a second biasing of a lesser amount than that of said first biasing means on said member in a direction opposite to that applied to said member by said first biasing means whereby said member and reel are biased in unison in a belt rewind direction by said second biasing means when said first biasing means bias is relieved.

17. The safety belt tensioning and rewind means of claim 13 wherein said second spring means comprises a constant torque spring for applying a constant value bias on said reel in a belt rewinding direction when said blocking means is blocking out the bias of said first spring means.

18. The safety belt tensioning and rewind means of claim 16 wherein said second biasing means comprises a constant torque means for applying a constant value of tension on said belt when the bias of said first biasing means is relieved.

19. In a safety belt retractor having a safety belt storage reel rotatably mounted to a retractor frame and means for selectively applying either of two levels of belt rewind bias on said reel, the improvement comprising the provision of:

constant torque rewind means connected to said reel for applying the lower one of said two levels of belt rewind bias at a constant value of bias whereby a constant tension is applied to said belt during belt movement under the lower one of said levels of belt rewind bias.

* * * * *

Disclaimer

4,081,153.—*Akira Tanaka*, Northridge, and *Charles Ulrich*, Montecito, Calif. SAFETY BELT TENSIONING AND REWINDING RETRACTOR. Patent dated Mar. 28, 1978. Disclaimer filed May 30, 1978, by the assignee, *American Safety Equipment Corporation*.

The term of this patent subsequent to May 31, 1994, has been disclaimed.
[*Official Gazette August 22, 1978.*]